Jan. 6, 1970  R. R. HOCQ  3,488,136
LIGHTERS
Filed Feb. 20, 1968  11 Sheets-Sheet 1
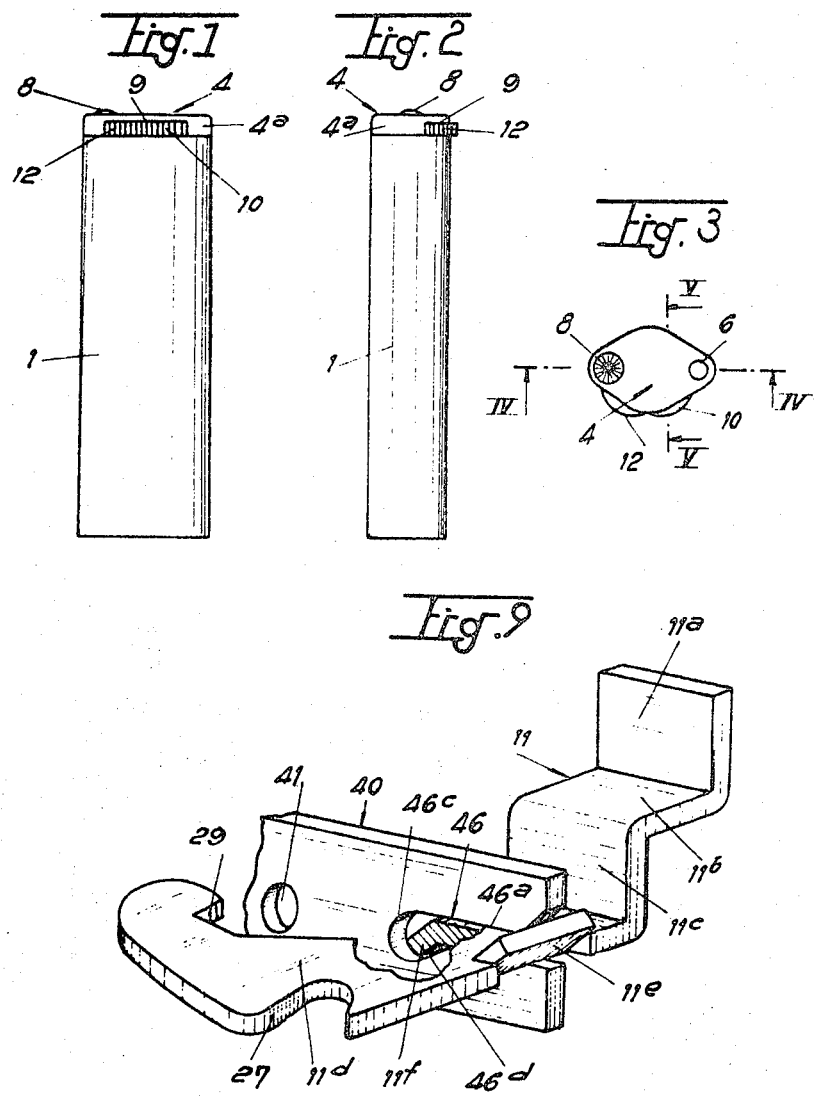
ROBERT RAYMOND HOCQ
By Parmelee, Utzler & Welsh
his attys.

Jan. 6, 1970  R. R. HOCQ  3,488,136
LIGHTERS
Filed Feb. 20, 1968  11 Sheets-Sheet 2
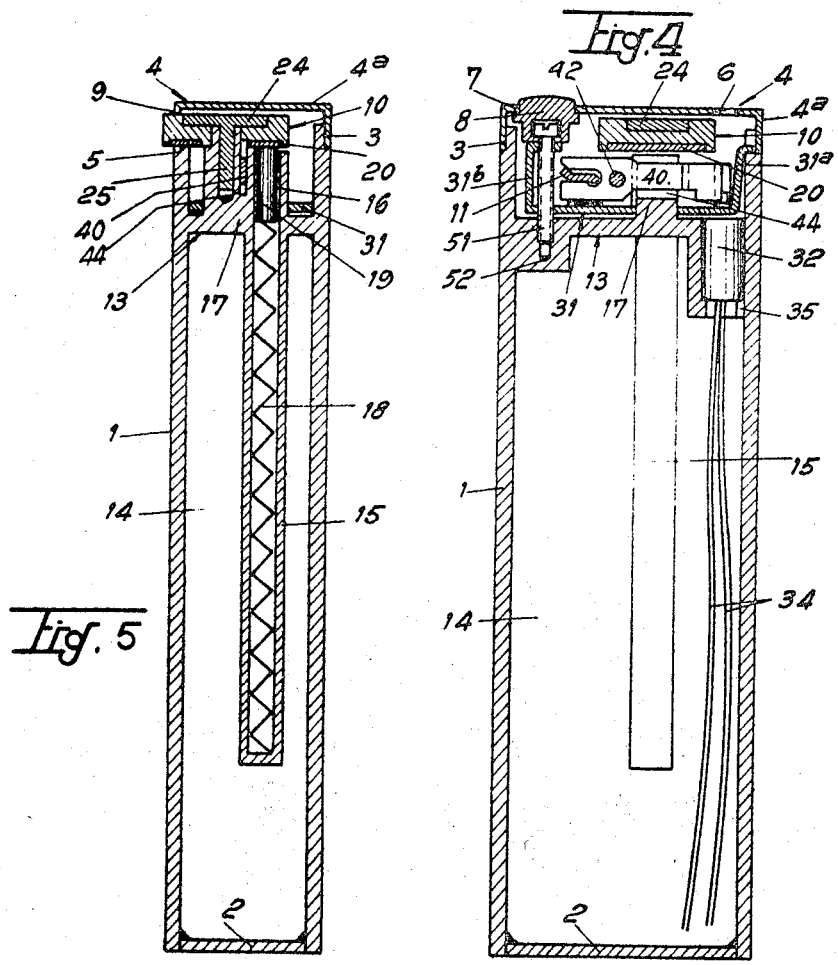
ROBERT RAYMOND HOCQ.
By Parmelee, Utzler & Walsh.
his Attys.

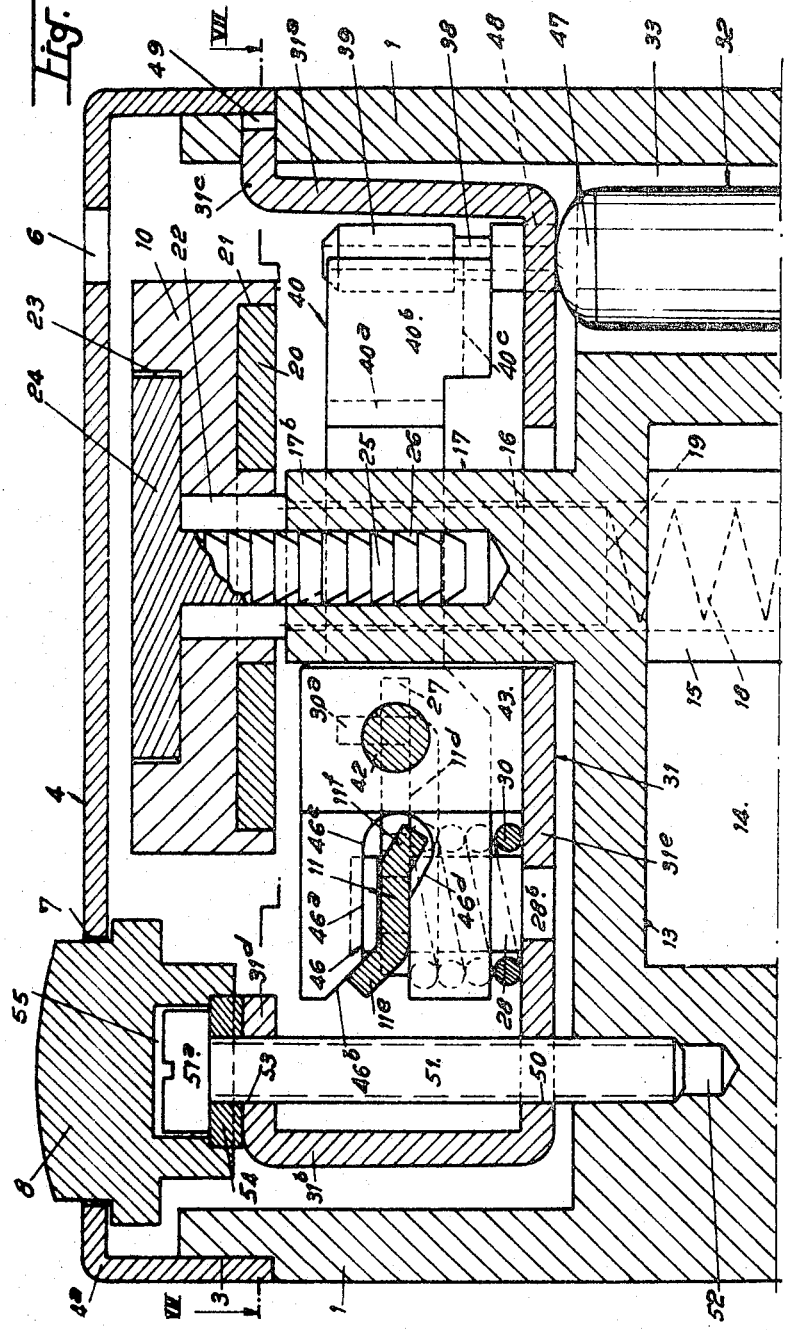

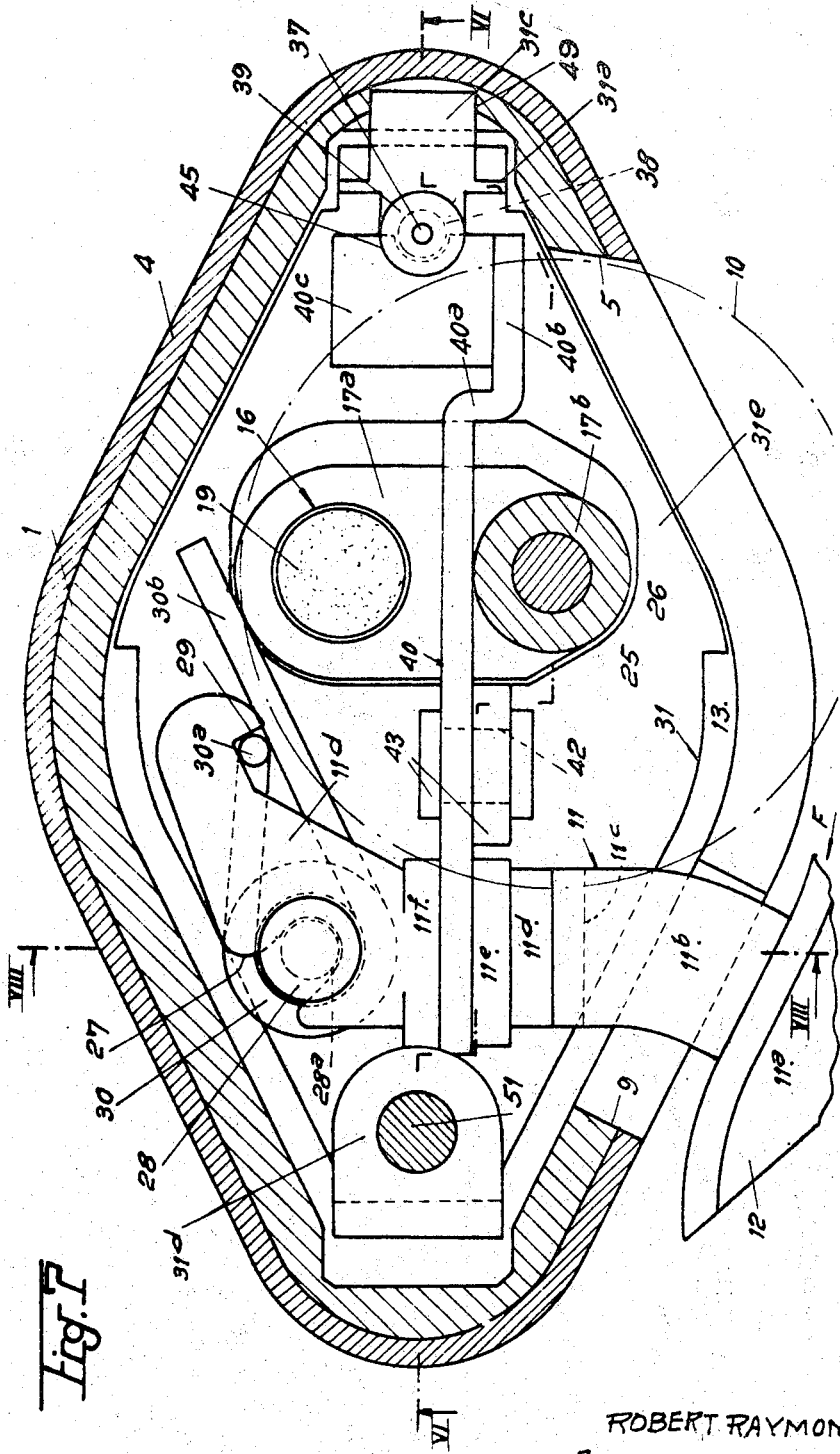

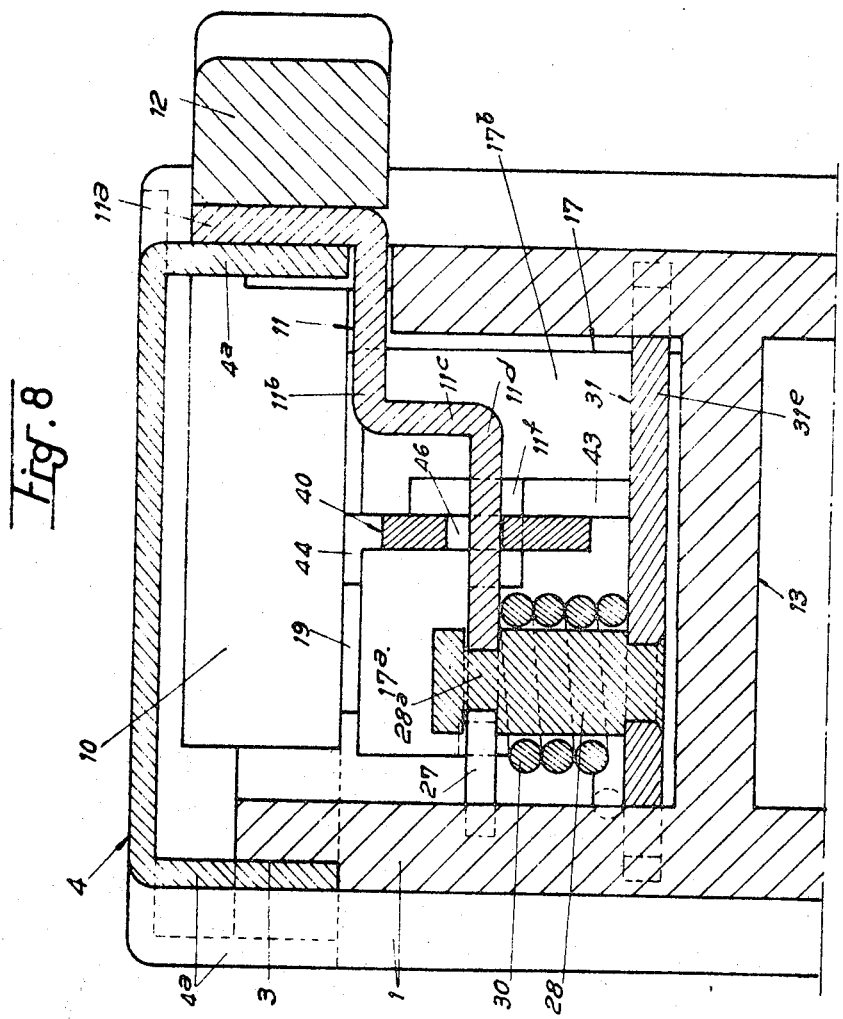

Jan. 6, 1970                R. R. HOCQ                3,488,136
                            LIGHTERS
Filed Feb. 20, 1968                              11 Sheets-Sheet 6

ROBERT RAYMOND HOCQ.
By Parmelee, Utzler & Walsh.
his Attys.

ROBERT RAYMOND HOCQ.

ROBERT RAYMOND HOCQ

United States Patent Office 3,488,136
Patented Jan. 6, 1970

1

3,488,136
LIGHTERS
Robert R. Hocq, Boulogne-Billancourt, France, assignor to Societe Franco-Hispano-Americaine Francispam, Paris, France, a corporation of France
Filed Feb. 20, 1968, Ser. No. 706,888
Claims priority, application France, Feb. 28, 1967, 96,780
Int. Cl. F23q 1/02
U.S. Cl. 431—276        7 Claims

ABSTRACT OF THE DISCLOSURE

The specification describes a lighter with which, in use, a spark is obtained from a flint by rotation of a thumbwheel, wherein the flint co-operates with a lateral face of the thumbwheel to produce the spark, and also describes operating mechanisms and flame height adjusting arrangements for such lighters.

---

This invention relates to lighters, and in particular to semi-automatic gas lighters.

In Austrian patent specification No. 252,637 there is described a gas-lighter which comprises an external case, a gas reservoir inside the case, an expansion valve carried by the reservoir and embodying a burner valve the head of which can be lifted in order to release the gas, a partition separating the reservoir from the operating mechanism of the lighter, a flint tube, a flintwheel, a thumbwheel for operating the flintwheel, a pivoting control lever associated with a return spring and situated in the immediate vicinity of the thumbwheel, and a pivoting valve lever designed to engage with the head of the burner valve, the thumbwheel projecting beyond one of the lateral faces of the case.

According to the present invention there is provided a lighter with which, in use, a spark is obtained from a flint by rotation of a thumbwheel, wherein said flint co-operates with a lateral face of said thumbwheel to produce said spark.

Preferably lighters in accordance with the present invention have a housing which is separated by a partition into a fuel reservoir and an operating mechanism compartment in which case said flint can be contained in a flint-tube which is fixed to said partition perpendicularly thereto and said thumbwheel can be arranged to rotate about an axis parallel to said flint-tube.

Preferably gas lighters in accordance with the present invention include an expansion valve carried by said reservoir, said expansion valve embodying a burner valve having a head which can be lifted to release gas for ignition by said spark. Such a gas lighter can include a pivotal control lever, and a return spring associated with said control lever, operation of said control lever against the action of said return spring effecting lifting of said head of said burner valve, and said control lever can be arranged to pivot about an axis which is perpendicular to said partition.

Preferably said control lever lifts said head of said burner valve by way of a pivotal valve lever which, in use, co-operates with both said control lever and said head of said burner valve.

The pivot for said control lever can be constituted by said flint tube.

Said thumbwheel can be pivotably mounted on said control lever, and said valve lever preferably pivots about an axis parallel to said partition, in which case the pivot for said valve lever can be constituted by said flint tube.

Preferably lighters in accordance with the present invention include means to vary the height of the flame obtained therefrom, and with gas lighters said means can

2 comprise a porous plug in said expansion valve, in which plug, in use, the gas vapourises, and an adjusting arrangement by means of which said porius plug can be compressed.

Said adjusting arrangement can compromise a regulating knob rotatably mounted on a spindle carried by said partition; a substantially U-shaped regulating lever, one end of said regulating lever engaging a seating on said housing and the other end of said regulating lever engaging a cam surface provided on said regulating knob; and a thrust member arranged between a point on the base of said regulating lever near said one end thereof, and said porous washer, the arrangement being such that rotation of said regulating lever causes said thrust member to act on said porous plug to vary its degree of compression. With lighters including such an arrangement the pivot for said control lever and the pivot for said valve lever can both be carried by said regulating lever.

Alternatively said adjusting arrangement can comprise a regulating lever and a thrust member arranged between said regulating lever and said porous plug, the arrangement being such that movement of said regulating lever causes said thrust member to act on said porous plug to vary its degree of compression.

Preferably in lighters in accordance with the present invention said thumbwheel is a composite body comprising a first circular member the peripheral edge of which is thumbed in use, and a second, annular member attached to said first member, one lateral face of said second member constituting at least part of said lateral face of said thumbwheel.

Two embodiments of lighters in accordance with the present invention will now be described by way of example with reference to the drawings in which:

FIGURES 1 and 2 are elevations taken at right-angles to one another, and FIGURE 3 is a plan of the first embodiment, FIGURES 4 and 5 are sectional elevations on the lines IV—IV and V—V respectively in FIGURE 3.

FIGURE 6 is a vertical sectional elevation on the line VI—VI in FIGURE 7,

FIGURE 7 is a horizontal sectional elevation on the line VII—VII in FIGURE 6,

FIGURE 8 is a sectional elevation on the line VIII—VIII in FIGURE 7,

FIGURE 9 is a perspective view of part of the mechanism shown in FIGURE 8,

Figure 10:
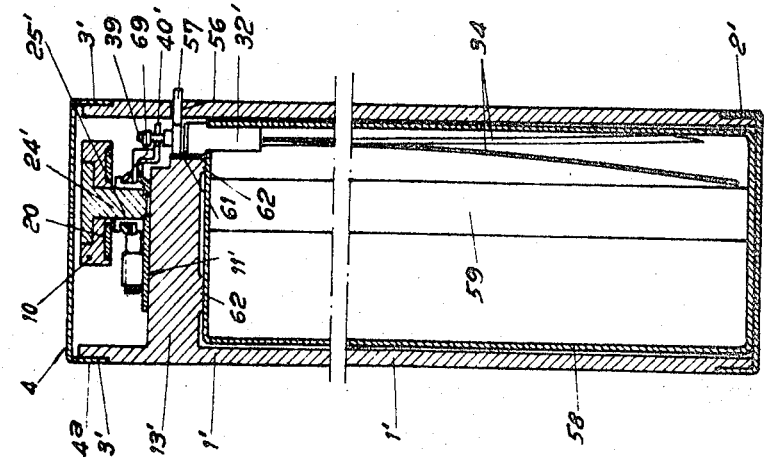
Figure 11:
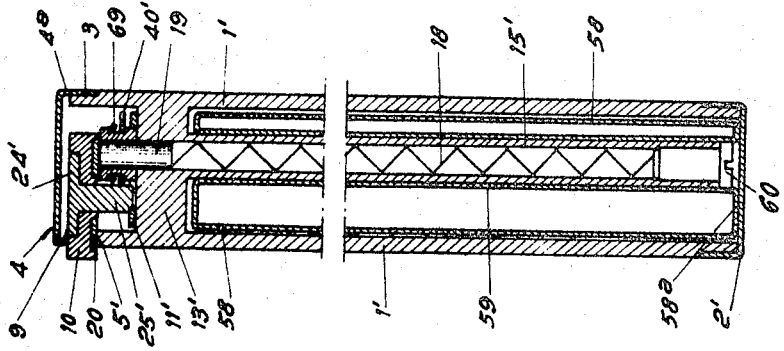
Figure 12:
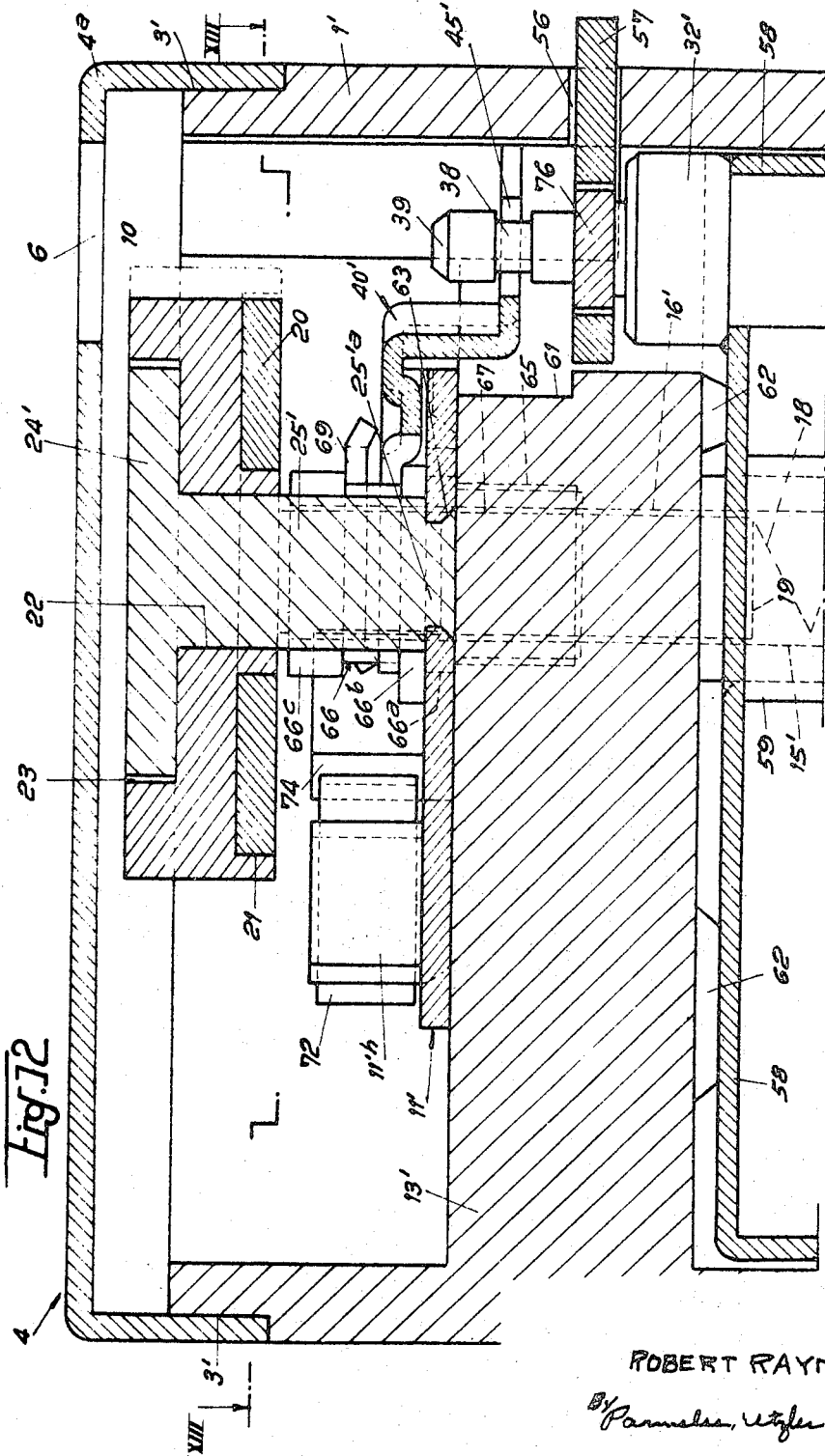
Figure 13:
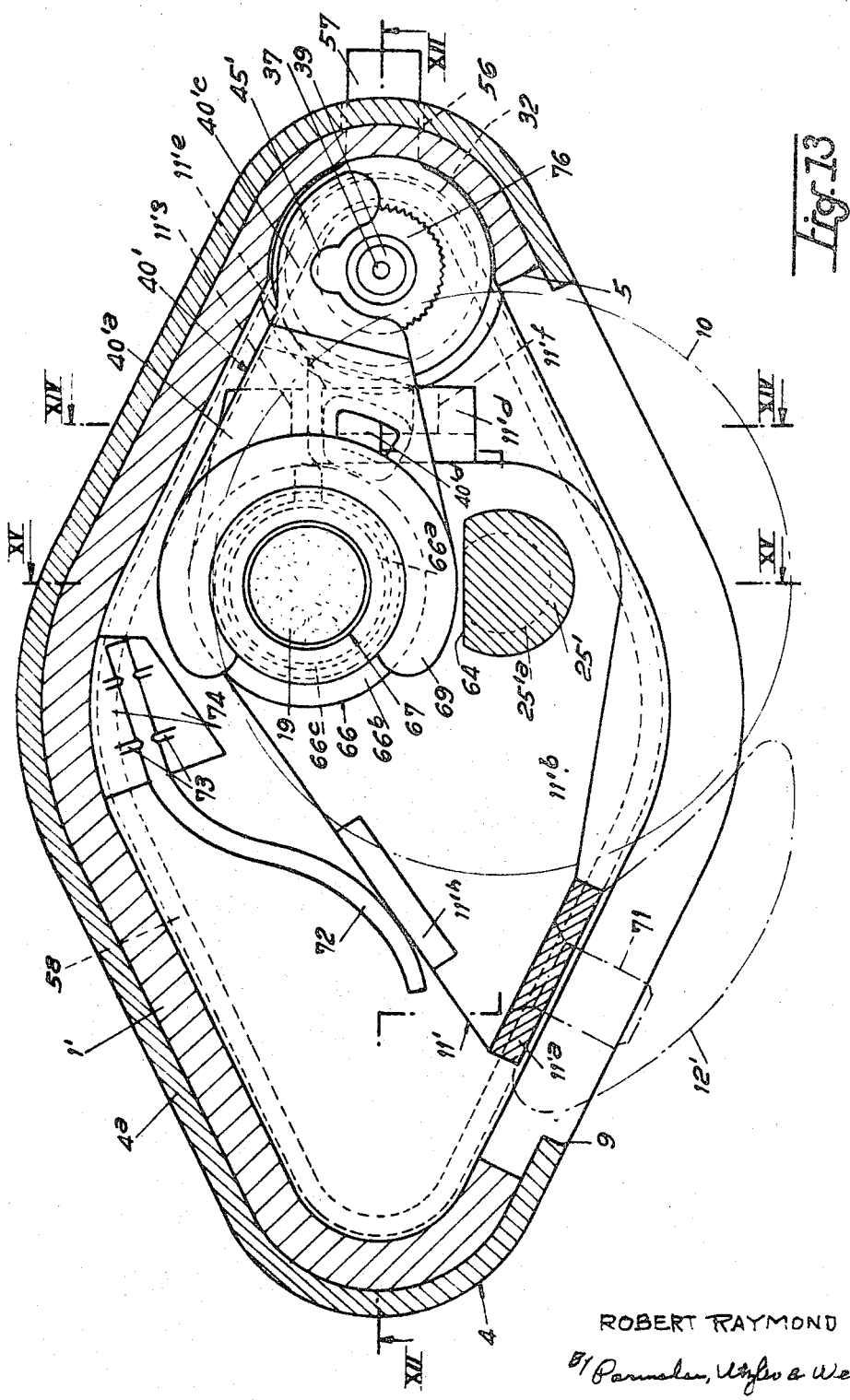
Figure 14:
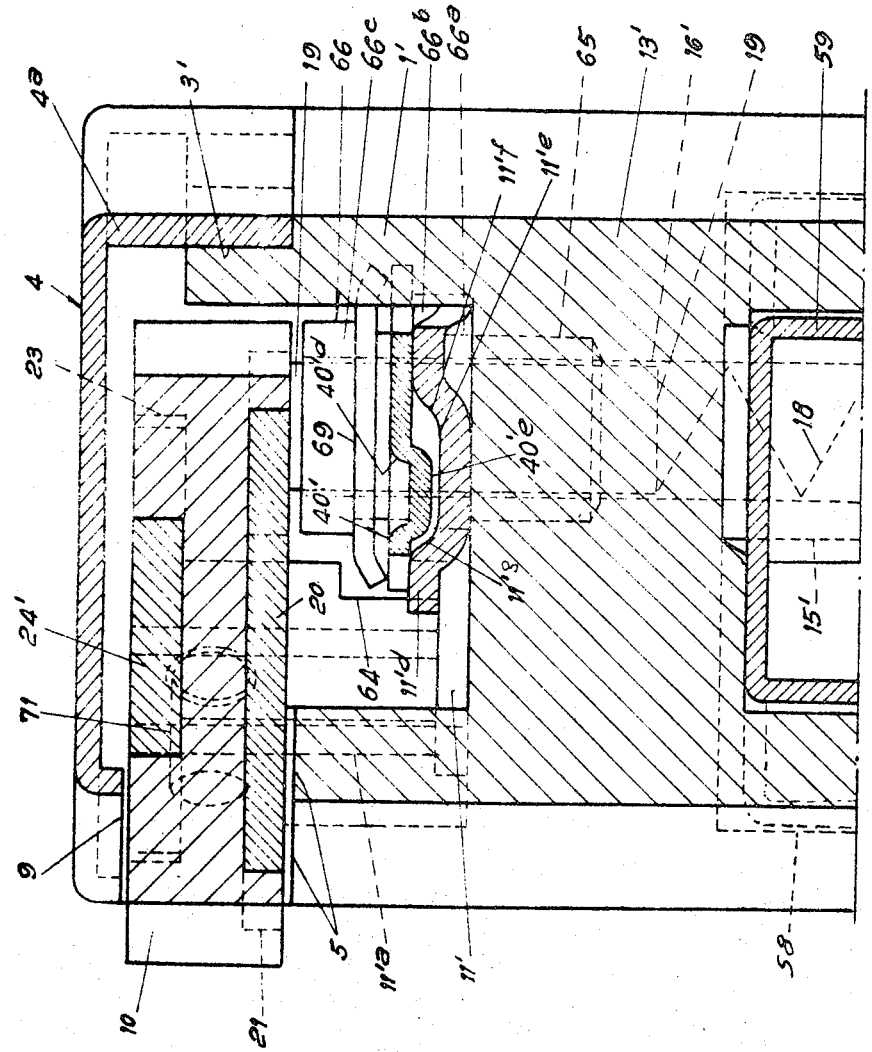
Figure 75:
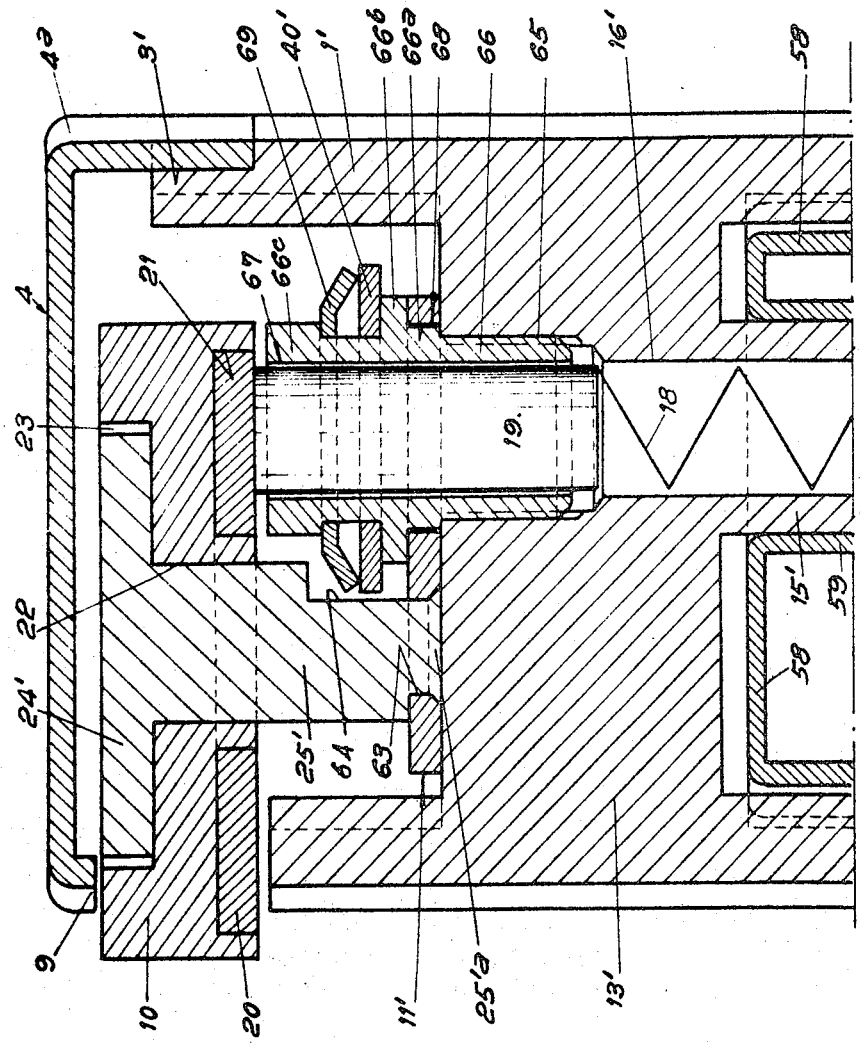
Figure 16:
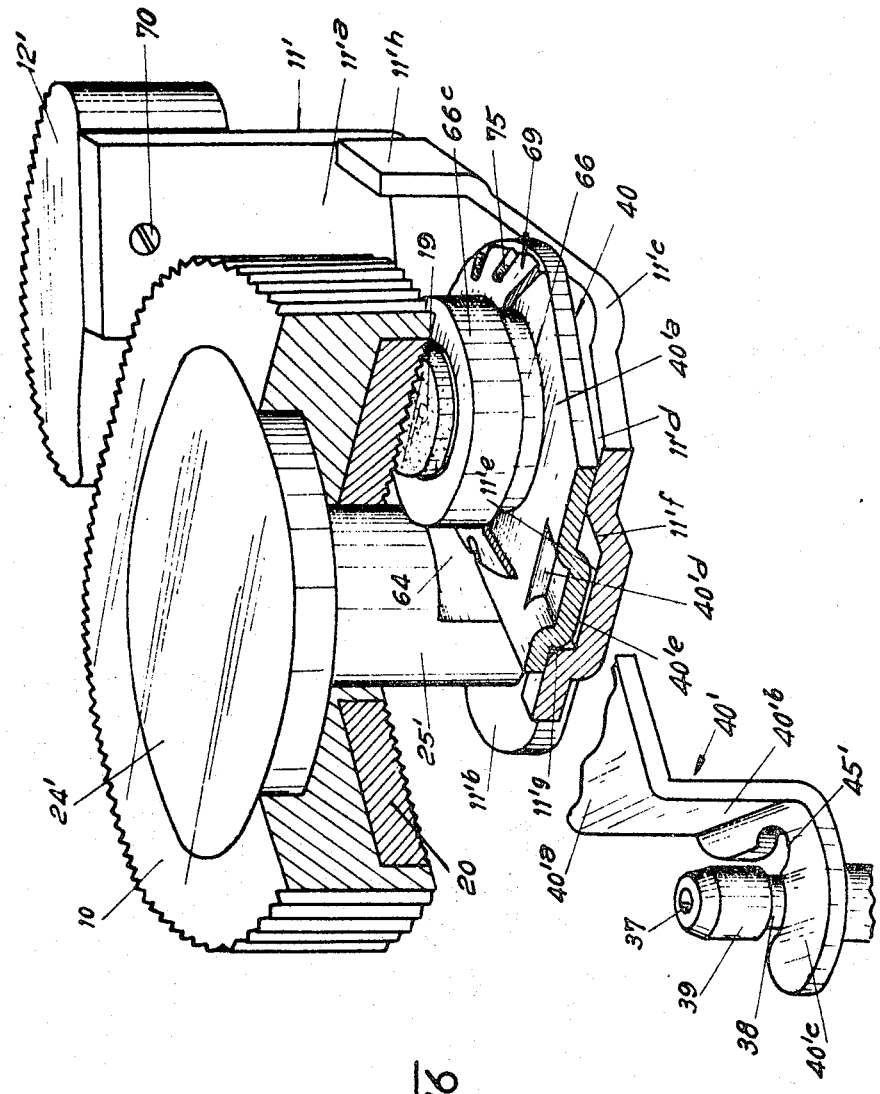

FIGURES 10 and 11 are respectively sectional elevations similar to those shown in FIGURES 4 and 5, but of the second embodiment, FIGURE 12 is a vertical sectional elevation on the line XII—XII in FIGURE 13, FIGURE 13 is a horizontal sectional elevation on the line XIII—XIII in FIGURE 12, FIGURES 14 and 15 are respective sectional elevations of the lines XIV—XIV and XV—XV in FIGURE 13, and FIGURE 16 is a perspective cut-away view of part of the second embodiment.

Referring to FIGURES 1 to 5 the lighter has the general shape of a parallelepiped of substantially lozenge-shaped cross-section, the corners of which are rounded. It comprises a case 1, closed at one end by a base 2, and open at the other. The free edge of the case 1 is provided about the greater part of its periphery with a rebate 3 designed to receive the peripheral portion 4a of a cap 4, and is interrupted at a position 5 over a certain length, along two adjacent sides of the lozenge-shaped case 1. The cap 4 has two circular openings 6, 7 at the top, serving respectively for the passage of the flame and for the passage of a knob 8 for controlling the flame height, and at two adjacent sides of the case 1, an aperture 9 is provided, aligned with the cut-out 5, in order to pass a thumbwheel 10 and a control lever 11 equipped with an operating button 12.

Referring now to FIGURES 6 and 7 also, the case 1 is divided internally into two parts by a transverse partition 13. The larger part of the case 1, below the partition 13 (FIGURES 4 and 5) constitutes a reservoir 14 which is designed to carry liquid gas. That part of the case which is above the partition 13 houses the lighter-operating mechanism which will now be described.

The partition 13 carries a flint tube 15 which extends into the interior of the reservoir 14, a cylindrical bore 16 formed in a part 17a of a boss 17 projecting above the partition 13. The tube 15 contains a spring 18 which forces a flint 19 into contact with a flat annular flintwheel 20 mounted in a seating 21 (FIGURE 6) formed in the lower lateral face of the thumbwheel 10. The thumbwheel 10 is constituted by a disc pierced centrally by a bore 22 and hollowed out at its top face to form a circular seating 23 to receive the head 24 of a fixing screw, the shank 25 of which is screwed into a threaded bore 26 in a cylindrical extension 17b of the boss 17. As indicated, the thumbwheel 10 projects out of the case 1 and is knurled at its periphery in order to enable the user's thumb to engage it properly. Under the action of the user's thumb, the thumb wheel 10 is made to rotate, and thus causes the bottom face of the flintwheel 20 to grate over the flint 19.

The control lever 11 is constituted by a strip which, working from the exterior of the case 1 to the interior, comprises a first vertical section 11a soldered or fixed in some other appropriate fashion to the operating button 12, a first horizontal section 11b which is slightly bent, a second vertical section 11c, and a second horizontal section 11d bent in the opposite direction to the section 11b, the section 11d, at the junction between it and the preceding portion, being cut and bent back at an obtuse angle, as FIGURE 6 shows, in order to produce a lug 11e inclined upwards, and a lug 11f inclined downwards. At the obtuse-angled portion of section 11d, the lever 11 presents a cut-out 27 through the medium of which it can coooperate with a pivot 28, and, towards the free end of the section 11d there is a hook 29 designed to co-operate with a curved extremity 30a of a return spring 30 coiled about the pivot 28, the other extremity 30b of which spring bears against the boss 17.

The pivot 28 has a waisted portion 28a with which there engages the cut-out 27 in the lever 11, and it is riveted at one end 28b of smaller diameter, into a suitable hole in a regulating lever 31 which regulates the height of the flame.

An expansion valve 32 mounted in a seating 33 formed by the partition 13 and the case 1, serves in known fashion to convert the liquid gas (generally butane) contained in the reservoir 14, into gas, and controls the escape of the gas when the lighter is used. To this effect, a wick 34 (FIGURE 4) immersed in the reservoir 14 through an orifice 35 in the partition 13, supplies the liquid gas to the valve 32. The construction of this valve is of a generally known form, comprising a porous washer the degree of compression of which can be varied as desired in order to vary its porosity and therefore the gas flow. The vaporised gas follows a passage 37 formed axially in a piston 38 acting simultaneously as the valve and as the burner, and terminating at its top end in an enlarged head portion 39. A valve lever 40 (FIGURES 4 to 9) co-operates with the piston 38 and the head portion 39, in order to lift the piston and therefore allow the gas to escape.

The lever 40 is designed so that it is double-acting, and serves on the one hand to keep the valve closed, and on the other to open it and keep it open as long as the button 12 is used to operate the control lever 11.

To this end, the lever 40 is constituted by a substantially vertical strip, and pivots, by the provision of a hole 41, about a horizontal spindle 42 mounted in a vertical yoke 43 (FIGURES 7 and 8) carried by the regulating lever 31.

At a point 44, the lever 40 passes through the boss 17 (FIGURES 4, 5 and 8) between the parts 17a and 17b thereof, and is bent back at 40a (FIGURES 6 and 7). Its shortest extremity 40b, close to the head portion 39 of the burner, is folded horizontally at its bottom end in the direction of the interior of the lighter, at 40c, and contains a lateral cut-out 45 which co-operates with the rod 38 of the burner. The opposite extremity 40d of the lever 40 contains a cut-out 46, the shape of which is clearly visible in FIGURES 6 to 9, and which co-operates with the control lever 11. The cut-out 46 has a central portion 46a with mutually parallel edges which are also parallel to the length of the lever, a top external chamfered edge 46b, and a closed end of semicircular form 46c, running into the bottom edge of the part 46a through an inclined portion 46d. As FIGURES 6 and 9 indicate, the cut-out 46 receives the lever 11 in such a way that the lug 11e is normally applied against the edge 46b and that the lug 11f is normally inside the part 46c, 46d, the part 11d, of the lever, formed between the lugs 11e and 11f, resting against the bottom edge 46a of the cut-out.

The result of this is that if the button 12 on the lever 11 is depressed in the direction of the arrow F in FIGURE 7, the lever 11 is pivoted against the action of the spring 30. With this movement, the inclined lug 11f comes into contact with the edge 46d of the cut-out 46 and causes the lever 40 to pivot downwards, so that its forked head 40c lifts the head 39 of the burner and therefore opens the valve 32. When the button 12 on the control lever 11 is released, the spring 30 returns the lever 11 to its initial position, and the lug 11e in contact with the edge 46b tends to lower the extremity 40c, thus restoring the valve 32 to its seat.

A description will now be given of the arrangement used for regulating the flame height.

Referring to FIGURE 6, the valve 32 is shrouded by a component 47 of upwardly convex form containing a central opening for the passage of the burner piston 38. The regulating lever 31 bears against the top of the component 47 and contains an aperture 48 at this point to pass the valve piston 38. A section taken in the longitudinal vertical plane of the lighter shows the lever 31 to have a substantially U-shaped structure, the vertical arms 31a, 31b of which are substantially parallel to the wall of the case 1 and are folded horizontally in each case in the same direction, at 31c, 31d. The folded portion 31c bears against an appropriate seating 49 formed in the case 1. The base 31e of the U-section structure is parallel to the top face of the partition 13 and is located near to it, when in the rest position. It contains a hole 50 for the passage of a screwed spindle 51 which mates with a threaded hole 52 in the partition 13. The spindle 51 passes through a hole 53 in the folded portion 31d and has a head 51a (FIGURE 6) through the medium of which it connects to the folded portion 31d a linking component 54 of non-circular form loosely threaded over it. The screw 51 acts as an adjusting screw. In the factory, it is screwed into the hole 52, before assembly of the knob 8 and the cover 4, in order to produce minimum compression of the porous washer, i.e. to give maximum flame height. The head 51a and part of the component 54, are lodged in a counterbore 55 in the bottom face of the regulating knob 8. The counterbore 55 has a form corresponding to that of the component 54 in order that when the knob 8 is rotated, the knob simply being slid over the component 54 and held in place by the design of the opening 7 in the cap 4, the component 54 is rotated too. The component 54 is provided on its bottom face with two helical cam surfaces (not shown) in contact with an appropriate surface on the folded portion 31d. Rotation of the component 54 about the spindle 51 in one direction, this without rotating the spindle 51 itself, causes the folded portion 31d to slide downwards due to the provision of the hole 53, along the spindle 51, so that the lever 31 pivots about the pivot constituted by the point of engagement between the extremity 31c and the seating 49. During this downward movement of the lever 31, the base 31e of the U-section engages the boss 47 of the valve 32 and, through an appropriate intermediate mechanism, exerts a pressure on the porous washer of the valve 32 with the consequence that its porosity is reduced and the gas flow slowed. The amplitude of the movement is limited by the design of the cam surfaces on the component 54, so that the flame height cannot go below a certain minimum, otherwise there would be the risk of unwanted extinction of the flame or failure to light. If, on the other hand, the knob 8 is turned in the other direction and the piece 54 with it, then the lever 31 will move up and the porous washer is decompressed, thus increasing the gas flow to the maximum permitted by the setting of the screw 51.

Operation of the lighter will be apparent from the following description.

By thumbing the wheel 10, the user can rotate it, and the flintwheel 20 integral with the wheel 10 grates over the flint 19. At the end of the rotational movement, the thumb automatically comes into contact with the operating button 12 on the control lever 11, and causes this to pivot about the pivot 28. The lug 11e then comes into contact with the cam surface 46 on the valve lever 40, causing this lever to pivot and lift the head 39 of the valve piston, liberating gas. Ignition takes place, the control lever 11 remaining actuating by consequence of continued thumb pressure. When the user releases the button 12, the control lever 11, under the influence of its spring 30, reverts to its initial position as do the valve lever 40 and the piston 38 of the valve 32. Escape of gas is thus halted. Regulation of the flame height is achieved by rotating the knob 8 in the manner described.

The second embodiment of the invention will now be described with reference to FIGURES 10 to 16. In these figures, components identical to those of the first embodiment have the same references, and the modified components are given the same references followed by a prime.

The general external form of the lighter is as shown in FIGURES 1 to 3, but the arrangement for regulating the flame height is different, and can be discarded altogether. Consequently, there is no knob such as the knob 8 of the first embodiment. Instead, the case 1' (FIGURES 10, 12 and 13) contains an aperture 56 through which there extends a lever 57 for regulating the flame. In addition, the base 2' is detachable (FIGURES 10 and 11) to permit the introduction of a detachable reservoir 58 which is provided inside with a cylindrical partition 59 enclosing in sealed fashion the flint tube 15' carried by the partition 13'. The flint tube is similar to the tube 15 of the first embodiment, but is closed off at its bottom end by a screwed plug 60 (FIGURE 11) which is accessible for replacement of the flint, when the base 2' is removed. The tube 15' extends over the full height of the reservoir 58 in order that the plug 60 shall be located at the level of the base 58a of the reservoir. The partition 13' is interrupted at a position 61 (FIGURES 10 and 12) to pass the body 32' of the valve and the top extremity of the burner piston 38, 39. In addition, it has ridges 62 against which the top face of the reservoir 58 bears. However, the major differences between the two embodiments lie in the control and valve levers.

In the second embodiment, the control lever 11' pivots about the flint tube 15' and carries the spindle 25' for the thumbwheel 10. To this end, the lever 11' contains a hole 63 in which there is riveted the bottom end 25'a of the rod 25' which is not threaded, and has a flat 64 (FIGURES 13, 15 and 16) the purpose of which is to allow access to the valve lever 40'.

The bore 16' of the flint-tube 15', which contains the spring 18 is counterbored and threaded at a position 65 (FIGURES 12, 14 and 15) to receive a hollow component 66 with an external thread, which forms the pivot for the lever 11'. The bore 67 of the component 66 contains the flint 19. Externally, the component 66 has a shoulder 66a, through which it bears against the partition 13', and which is lodged in an aperture 68 in the lever 11'. A second shoulder 66b is interposed between the control lever 11', and the valve lever 40'. The component 66 terminates at its upper end in a head 66c, the bottom face of which acts as a stop for a spring washer 69 which also bears against the top face of one end 40'a of the lever 40'.

The shape of the lever 11' is visible in FIGURES 13 and 16. The lever 11' which is connected to the operating button 12' by a screw 70 (FIGURE 16) inserted into a blind bore 71 (FIGURES 13 and 14) in the head has a vertical portion 11'a which passes across the screw 70, a main horizontal portion 11'b of substantially triangular shape having in that of its sides closest to the burner 39, a deformation which can be seen in FIGURES 14 and 16. This deformation is produced by bending back the end at 11'c, so that it is higher than the portion 11'd, this higher portion containing a central depression 11'e in its top face. It will be noted that the edges 11'f, 11'g of this depression have different shapes (FIGURE 16). In the neighbourhood of the part 11'a, the lever 11' has a lateral lug 11'h directed upwards from the part 11'b over a substantial height, against which there can bear one end of a leaf spring 72 cranked in the manner shown in FIGURES 12 and 13, whose other end is held by the tongue 73 in a component 74 fixed to the case 1' of the lighter.

The lever 40' is constituted by a strip of material disposed generally horizontally, and not vertically as the lever 40. As FIGURE 16 shows, the extremity 40'c of the lever 40, which is nearest the burner, is hollowed out laterally at 45' in order to co-operate with the neck 38 of the burner. The adjacent portion 40'b is vertical, and the main portion 40'a is horizontal, viewed overall, although its top face contains a depression 40'd which results in a boss 40'e on its bottom face. The boss 40'e can lodge in the depression 11'e of the lever 11'.

The spring washer 69 has the form shown in FIGURES 13 and 16. It is concave in the downward direction, and, in order to improve its elasticity, its periphery is hollowed out at the point 75 (FIGURE 16). The distance between the top face of the portion 40'a of the lever controlling the valve, and the bottom face of the head portion 66c of the component 66, is shorter than the free length of the washer 69, so that when the component 66 is screwed into the counterbore 65, the washer 69 is compressed and biases the lever 40' upwards.

The operation of the second embodiment will be apparent from the following description.

Impelled by the thumb of the user, the wheel 10 is rotated as described hereinbefore, and further movement of the thumb of the user results in operation of the button 12', so that the lever 11' is pivoted about the component 66. The lever 11' operates the valve lever 40' by the action of the cam surface 11'f on the boss 40'e, until the cut-out 45' in the valve lever engages the piston 38. The lever 40', on hitting the piston 38, is inhibited from further rotation by the lever 11'. The lever 40' is therefore lifted by the cam surface 11'f on the lever 11' which itself continues to rotate. In lifting, the lever 40' lifts the head 39 of the burner, and the gas commences to escape. It is immediately ignited by the sparks produced as a consequence of friction between the flintwheel 20 and the flint 19 due to rotation of the thumbwheel 10.

When the thumb pressure on the button 12' is relaxed, the control lever 11', urged by the spring 72 bearing on it at 11'h, rotates in the opposite direction to that aforedescribed, back into its closed position. During this movement, the valve lever 40' descends into the depression 11'e in the lever 11', moving down under the effect of the spring washer 69, and the piston 38 of the burner also lowers and the valve shuts off the gas flow. The closing movement continues, and the surface 11'g of the lever 11' comes into contact with the boss 40'e bringing the valve lever 40' back to its original position, so that the piston 38 is released to permit the reservoir to be exchanged if required.

The arrangement for regulating the flame height is constituted by a gear 76 (FIGURES 12 and 13) concentrically disposed with respect to the burner 38, 39, with which there engages, after assembly of the reservoir, the regulating lever 57, which is provided to this end with an opening, the periphery of which is toothed in the same way as the gear 69. Since the lever 57 is flat and guided in the aperture 56 of the case 1', and since the introduction of the reservoir 58 into the lighter is effected from the base thereof, i.e. perpendicularly to the plane of the lever 57, the engagement between the two elements is virtually automatic, and a very slight pivoting movement of the lever 57 is sufficient to engage the teeth.

In a variant embodiment which has not been shown, the arrangement for regulating the flame height is totally discarded, and the case contains no opening 56 for a lever 57.

It will be appreciated that the embodiments described above can be subjected to numerous modifications. In particular, in the embodiment shown in FIGURES 1 to 9, the kinematic link between the knob 8 and the lever 31 of the mechanism for regulating the flame height can be different. In addition, the embodiment shown in FIGURES 1 to 9 can incorporate a detachable reservoir, the partition 13 being then located in an appropriate manner and the base of the case being detachable. This embodiment could also include a different arrangement for flame height regulation, or could dispense with such regulation altogether. In the latter instance, the pivot 28 and the yoke 43 would be directly attached to the partition 13.

The embodiment shown in FIGURES 10 to 16 could also include a different arrangement for regulating the flame height, for example one on the lines of that shown in FIGURES 1 to 9. In this event, the control lever 11' would bear against the regulating lever 31 and not directly against the partition 13'.

The arrangement for regulating the flame height in the embodiment shown in FIGURES 10 to 16 can be modified by providing a bevel gear, concentrically disposed with respect to the burner, and a bevel gear carried on a spindle so mounted as to be able to rotate in the opening 57 and equipped externally with a knurled operating knob.

What I claim as my invention and desire to secure by Letters Patent of the United States is:

1. In a semi-automatic gas-lighter comprising an external case, a gas reservoir inside the case, an expansion valve carried by the reservoir and embodying a burner valve the head of which can be lifted in order to release the gas, a partition separating the reservoir from the operating mechanism of the lighter, a flint tube, a flintwheel, a thumbwheel for carrying and operating the flintwheel, a pivoting control lever associated with a return spring and situated in the immediate vicinity of the thumbwheel, and a pivoting valve lever designed to engage with the head of the burner valve, with the thumbwheel projecting beyond one of the lateral faces of the case, the improvement consisting in that the thumbwheel is rotatably mounted perpendicularly to the said partition and rotates about an axis parallel to the flint tube which is fixed to said partition, the control lever is pivoted about an axis also perpendicular to said partition and is as a whole parallel to said partition, and that the valve lever and the control lever are provided with cooperating means for mutual engagement.

2. The gas lighter according to claim 1 wherein the pivot of the control lever is formed by the flint tube and the said control lever carries the pivot of the thumbwheel which carries the flintwheel.

3. A gas lighter according to claim 1 wherein the valve lever and the control lever are pivotably mounted upon the flint-tube and the cooperating means for mutual engagement of said levers include cooperating projections provided on each of said levers.

4. In a semi-automatic gas-lighter comprising an external case, a gas reservoir inside the case, an expansion valve carried by the reservoir and embodying a burner valve the head of which can be lifted in order to release the gas, a partition separating the reservoir from the operating mechanism of the lighter, a flint tube, a flintwheel, a thumbwheel for carrying and operating the flintwheel, a pivoting control lever associated with a return spring and situated in the immediate vicinity of the thumbwheel, and a pivoting valve lever designed to engage with the head of the burner valve, the thumbwheel projecting beyond one of the lateral faces of the case, the improvement consisting in that the thumbwheel and the control lever are both rotatably mounted perpendicularly to the said partition in order to rotate about respective axis parallel to the flint tube which is fixed to said partition, the control lever being as a whole parallel to said partition, and that the valve lever and the control lever are provided with cooperating means for mutual engagement.

5. A gas lighter according to claim 4, wherein the pivot of the valve lever is parallel to said partition and the cooperating means for mutual engagement comprise on the one hand at the end of the valve lever remote from the burner valve a cut-out having two edges parallel to the said partition, two inclined edges substantially parallel to each other and one of which opens outwardly while the other merges into a closed, partly circular end of the cut-out, and on the other hand on the control lever, two lateral lugs parallel and inclined in opposite directions with respect to the plane of that portion of said lever which includes said lugs, and adapted to engage respectively the inclined edges of the cut-out in the valve lever.

6. In a semi-automatic gas-lighter comprised of an external case, a gas reservoir inside the case, an expansion valve carried by the reservoir and embodying a burner valve the head of which can be lifted in order to release the gas, a partition separating the reservoir from the operating mechanism of the lighter, a flint tube, a flintwheel, a thumbwheel for carrying and operating the flintwheel, a pivoting control lever associated with a return spring and situated in the immediate vicinity of the thumbwheel, and a pivoting valve lever adapted to engage with the head of the burner valve, with the thumbwheel projecting beyond one of the lateral faces of the case, the improvement consisting in that the thumbwheel and the control lever are both rotatably mounted perpendicularly to the said partition in order to rotate about respective axis parallel to the flint tube which is fixed to said partition, the control lever being as a whole parallel to said partition, so that the valve lever and the control lever are provided with cooperating means for mutual engagement, and that the lighter further comprises means for regulating at will the height of the flame, said means comprising a control knob rotatably mounted in the upper face of the case for rotation about an axis carried by the said partition, and including an operating cam surface for causing pivotment of a regulating lever of generally U-shaped cross-section in a plane perpendicular to the said partition, said regulating lever bearing by means of the arm of the U remote from the arm acted upon by the cam surface against a suitable seating in the case, a portion of the base of the U adjacent to said seating engaging a thrust member integral with the valve and which in turn is designed to act in a known manner upon a porous washer to vary its degree of compression and thus its porosity to the flow of gas through said washer for varying the flame height.

7. A gas lighter according to claim 6, wherein the pivot of the control lever and the yoke in which is mounted the pivot of the valve lever are both carried by the said regulating lever.

References Cited

UNITED STATES PATENTS

| | | | |
|---|---|---|---|
| 1,718,038 | 6/1929 | Douglas | 431—136 |
| 1,819,319 | 8/1931 | Bell et al. | 431—274 |
| 2,484,287 | 10/1949 | Halko | 431—135 X |
| 2,621,502 | 12/1952 | McGill | 431—134 |
| 3,150,507 | 9/1964 | Smith | 431—131 X |
| 3,208,243 | 9/1965 | Zellweger | 431—131 X |
| 3,328,980 | 7/1967 | Reim | 431—131 X |

FOREIGN PATENTS 1,462,353  11/1966  France.

EDWARD J. MICHAEL, Primary Examiner

U.S. Cl. X.R.

431—277